(12) United States Patent
Dupre, Jr. et al.

(10) Patent No.: US 8,535,790 B2
(45) Date of Patent: Sep. 17, 2013

(54) MOLD- AND MOISTURE-RESISTANT GYPSUM BOARDS

(75) Inventors: Frederick C. Dupre, Jr., Atlanta, GA (US); Kathleen Dalburg, Dallas, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 159 days.

(21) Appl. No.: 13/228,111

(22) Filed: Sep. 8, 2011

(65) Prior Publication Data

US 2011/0318574 A1    Dec. 29, 2011

Related U.S. Application Data

(62) Division of application No. 11/137,793, filed on May 26, 2005, now Pat. No. 8,034,416.

(51) Int. Cl.
*B32B 13/08* (2006.01)
*B32B 13/12* (2006.01)

(52) U.S. Cl.
USPC ........... 428/219; 428/220; 428/332; 428/340; 428/537.7; 428/703; 106/15.05

(58) Field of Classification Search
USPC ..................................... 428/537.7
See application file for complete search history.

(56) References Cited

U.S. PATENT DOCUMENTS

| | | | |
|---|---|---|---|
| 2,806,811 A | 9/1957 | Hazmburg | |
| 3,616,144 A | 10/1971 | Kenney | |
| 3,692,620 A * | 9/1972 | Beckman et al. | 442/181 |
| 4,124,554 A | 11/1978 | Fry | |
| 4,311,767 A | 1/1982 | Kennedy | |
| 4,470,877 A | 9/1984 | Johnstone et al. | |
| 4,647,496 A | 3/1987 | Lehnert et al. | |
| 4,764,420 A | 8/1988 | Gluck et al. | |
| 4,785,073 A | 11/1988 | Farkas et al. | |
| 5,055,323 A | 10/1991 | Kole et al. | |
| 5,079,078 A | 1/1992 | Jutte, Jr. et al. | |
| 5,552,186 A | 9/1996 | Bourlier et al. | |
| 5,681,917 A | 10/1997 | Breyer et al. | |

(Continued)

FOREIGN PATENT DOCUMENTS

JP    54-132622 A  * 10/1979
WO   WO 2004076770 A1 *  9/2004

OTHER PUBLICATIONS

Definition of "B-stage" from the electronic version of Bookbinding and the Conservation of Books: A Dictionary of Descriptive Terminology, accessed Oct. 19, 2009, at http://cool.conservation-us.org/don//dt/dt0498.html.

(Continued)

*Primary Examiner* — David Sample
(74) *Attorney, Agent, or Firm* — Ram W. Sabnis (57) ABSTRACT

Mold- and moisture-resistant gypsum boards and methods for making them are disclosed, the method comprising applying a slurry that forms a gypsum core to an upper or a lower facing sheet impregnated with a thermoset resin (e.g., a phenol-formaldehyde resin) in an amount effective to (i) allow water vapor passage through the facing sheet when the thermoset resin is in its uncured state and (ii) provide mold and moisture resistance to the facing sheet when the thermoset resin is in its cured state and heating sufficiently to cure said resin and dry said gypsum core, thereby yielding said gypsum board.

19 Claims, 6 Drawing Sheets

(56) References Cited

U.S. PATENT DOCUMENTS

| | | |
|---|---|---|
| 5,772,846 A | 6/1998 | Jaffee |
| 5,791,109 A | 8/1998 | Lehnert et al. |
| 5,864,003 A | 1/1999 | Qureshi et al. |
| 6,187,697 B1 | 2/2001 | Jaffee et al. |
| 6,689,451 B1 | 2/2004 | Peng et al. |
| 6,706,845 B2 | 3/2004 | Ingram et al. |
| 6,737,156 B2 | 5/2004 | Koval et al. |
| 6,746,781 B2 | 6/2004 | Francis et al. |
| 6,770,354 B2 | 8/2004 | Randall et al. |
| 2003/0236041 A1 | 12/2003 | Lee |
| 2004/0038065 A1* | 2/2004 | Francis et al. ............ 428/537.7 |

OTHER PUBLICATIONS

Rempp and Merrill, Polymer Synthesis, Huthig & Wepf, pp. 56-57, dated 1986.

\* cited by examiner

MOLD- AND MOISTURE-RESISTANT GYPSUM BOARDS

CROSS-REFERENCE TO RELATED APPLICATION

This application is a division of U.S. patent application Ser. No. 11/137,793, filed on May 26, 2005 and amended thereafter, the entireties of the disclosure and amendments are incorporated herein by reference.

FIELD OF THE INVENTION

The present invention relates to mold- and/or moisture-resistant gypsum boards (e.g., gypsum wallboards) and methods of making them. The gypsum boards comprise a gypsum core that is faced on one or both sides with a facing sheet comprising a thermoset resin (e.g., a crosslinked phenol-formaldehyde resin) that was heat reactive (i.e., that could further polymerize upon heating) during the preparation of the board. Advantageously, during manufacturing of the gypsum board, the resin is cured to its thermoset condition during normal drying of the gypsum core.

BACKGROUND OF THE INVENTION

The presence of mold and mildew in residential and commercial buildings is an issue of increasing concern. Aside from being unsightly, mold has allegedly been linked to a myriad of health conditions, including allergic reactions, infections, irritation of the mucous membranes and respiratory system, detrimental effects on the central nervous system (e.g., disorientation, dizziness, and diminished reflexes and attention span), and desensitivity or hypersensitivity to mold over time. So-called "toxic" molds, while less prevalent, are alleged to contribute to more serious conditions, including immune system suppression, organ damage, blood vessel rupture, depression, infertility, and cancer.

Mold spores are ubiquitous in both indoor and outdoor air. Virtually any surface, inorganic as well as organic, having residual moisture or dampness can provide the necessary environment for these mold spores to survive and potentially grow. With sufficient moisture, accumulated dust or even the surface itself, upon which mold spores happen to land, can serve as a food source for mold growth.

For the above reasons, the construction industry is continually challenged with the prevention of mold growth, mainly through the minimization or elimination of sources of moisture. These sources can stem from wet building materials, leakage through the building envelope or in the plumbing system, HVAC condensation, or flooding. Many of the problems leading to mold growth occur during the construction phase, when materials are installed without sufficient regard for minimizing the exposure to moisture.

Gypsum is among the most important and prevalent materials used in the housing and building construction industry. The conventional manufacturing of gypsum board for use in wall and roofing materials is well known and generally involves forming a core layer of wet plaster slurry between two sheets of a heavy paper (e.g., multi-ply paper) or cardboard material. When the wet plaster core sets and is dried, a strong, rigid, and fire-resistant building material results. The paper- or cardboard-based sheets that sandwich the gypsum core are referred to in the industry as facing paper. Unfortunately, conventional gypsum facing paper is often not sufficiently water resistant to prevent the growth of mold and mildew when the board is subjected to severe moisture stresses.

The modification of facing materials on a number of substrates and for a variety of purposes is known in the art. For example, U.S. Pat. No. 2,806,811 describes the addition of small quantities of resinous materials to the plies that make up the facing paper of gypsum board, in order to prevent delamination and splitting of the plies.

U.S. Pat. No. 3,616,144 describes a tile comprising a resin-bonded core portion and a facing layer. The facing layer is a fibrous material that may be impregnated with a resin to provide strength.

U.S. Pat. No. 4,470,877 describes a calcium sulfate-filled paper for use in making gypsum wallboard with reduced energy requirements.

U.S. Pat. No. 4,764,420 describes a barrier latex polymer-coated facing sheet of fibrous material to preserve the insulating properties of a rigid plastic foam core.

U.S. Pat. No. 5,079,078 describes a laminated panel having a gypsum or cement core and outwardly disposed, fire-resistant "skins" comprising a high density composite of glass fibers and resin.

U.S. Pat. No. 5,397,631 describes a fibrous mat-faced gypsum board that is coated with a substantially humidity- and water-resistant resinous coating containing a latex polymer.

U.S. Pat. No. 5,791,109 and related patents describe a gypsum board comprising a core that is faced with a fibrous mat that is made of woven or non-woven glass or synthetic fibers, in order to improve water and fire resistance.

U.S. Pat. No. 6,187,697 describes nonwoven resin-bound fibrous mats that can be used to face a myriad of surfaces to provide reinforcement and dimensional stability.

U.S. Pat. No. 6,689,451 describes a substrate that is laminated with cellulose paper that may be penetrated with resin. To prevent delamination caused by differential stresses, a polymeric film (e.g., polyurethane, acrylic, polyester, and others) is incorporated between the substrate and the paper.

U.S. Pat. No. 6,770,354 describes a moisture tolerant structural panel comprising a fibrous mat-faced gypsum board wherein the outer surface of the mat has a coating that is a mixture of a mineral pigment, an inorganic binder and a latex polymer binder.

U.S. Published Application No. 2003/0236041A1 describes a laminated sheet to improve fire resistance in various interior applications. The laminated sheet comprises a resin-impregnated paper that is stacked onto one or both faces of a sheet base that is obtained by impregnating a fire retardant material (e.g., glass cloth) with a resin, optionally containing tetrabromobisphenol A.

In view of the above disclosures, there is an ongoing need in the art for gypsum board construction materials having improved mold- and/or moisture resistance, as well as a potential for improved fire resistance. Ideally, such gypsum materials should be made in a cost-efficient manner with little or no alteration of existing processing conditions and production facilities.

SUMMARY OF THE INVENTION

The present invention is directed to the use of gypsum board facing sheet that has been modified to achieve improved mold- and/or moisture resistance, and possibly also improved fire resistance. In particular, the facing material is impregnated with a heat reactive resin (e.g., a B-staged resin), such that the resin can cure in a standard gypsum board drying operation. This drying step is required to remove water in excess of the amount needed for forming the gypsum core (i.e., setting the gypsum) from the plaster slurry that is originally sandwiched between the facing sheets. Importantly, the facing material impregnated with the heat reactive resin effectively allows water to evaporate from the gypsum core, thereby interfering only minimally, if at all, with the normal drying process. Moreover, after curing, the resin renders the faced gypsum board surfaces highly water resistant, thereby preventing or at least hindering the growth of mold or mildew.

In accordance with the present invention, one or preferably both of the gypsum core facing sheets, onto which the slurry used to form the gypsum core is applied, are impregnated with a heat reactive resin. Because the standard gypsum core drying step can also be used for the final resin cure, the process of the present invention may be adapted to conventional gypsum board manufacturing lines, without major equipment or process condition modifications.

Therefore, in one embodiment, the present invention is a method for making mold- and moisture-resistant gypsum board. The method comprises applying a slurry (e.g., a plaster slurry having various optional components) that forms a gypsum core to an upper or a lower facing sheet. The facing sheet is impregnated with a heat reactive resin (or has a heat reactive resin deposited thereon). After the applying step, sufficient heat is used to cure the resin and dry the set gypsum, thereby yielding the gypsum board. In a preferred embodiment, the heat reactive resin is a B-staged resin. In another preferred embodiment, the heat reactive resin is present in an amount representing, after curing, from about 1% to about 30% of the weight of the facing sheet.

In another preferred embodiment, the present invention is a method as described above, wherein the resin curing and core drying occur substantially simultaneously. In another preferred embodiment, the facing sheet comprises conventional multi-ply paper. In yet another preferred embodiment, the heat reactive resin comprises the reaction product of an aldehyde (e.g., formaldehyde) and an aromatic alcohol (e.g., phenol).

In another embodiment, the present invention is a gypsum board comprising a gypsum core that is faced on one or both faces with multi-ply facing paper comprising a thermoset resin that is present in an amount representing from about 1% to about 30% of the weight of the facing paper. In a preferred embodiment, the present invention is a gypsum board as described above, wherein the thermoset resin is a phenol-formaldehyde resin, prepared either from a phenolic resole or from a phenolic novolac with an added cross linking agent. In another preferred embodiment, the phenol-formaldehyde resin is cured during a gypsum core drying step in the manufacture of the gypsum board.

In another embodiment, the present invention is a conventional multi-ply facing paper for gypsum board having a B-staged thermosetting resin deposited thereon or, more appropriately, impregnated therewith, in an amount effective to (i) allow water vapor passage through the facing paper prior to curing the thermosetting resin and (ii) provide mold and moisture resistance to the facing paper when the thermosetting resin has been cured.

These and other embodiments are described herein.

BRIEF DESCRIPTION OF THE DRAWINGS

In FIGS. 2-6, results are presented for facing paper impregnated with resin in both the dried, uncured state (B-staged paper), as well as in the cured thermoset state.

DETAILED DESCRIPTION OF THE INVENTION

The mold- and/or moisture resistant gypsum board of the present invention may be employed in the same manner as conventional gypsum structural products, including wallboard, dry wall, gypsum lath, and gypsum sheathing. Preferably, the gypsum board is used in wallboard applications, and is especially suited for high humidity environments. The gypsum core of the board can be essentially the same type as commonly used in the above-mentioned gypsum construction materials. The source of the gypsum is therefore generally the natural mineral that is extracted from quarries, or synthetic gypsum, known as desulfogypsum, that is produced from the desulfurization of electrical power plant flue gas effluents. Combinations of natural and synthetic gypsum may be employed. In any event, whether natural rock or synthetic, the gypsum is typically dried, ground, calcined, and stored as plaster or stucco, known as calcium sulfate hemihydrate ($CaSO_4 \cdot \frac{1}{2}H_2O$). This stucco is a very dry powder that when mixed with water, re-hydrates over time and hardens back into calcium sulfate dihydrate ($CaSO_4 \cdot 2H_2O$), or the relatively hard mineral known as gypsum. This mineral typically accounts for more than about 85% by weight of the gypsum core. Often, the core material includes known additives, such as chopped glass fibers and/or wax emulsion, to increase fire and water resistance, respectively. Various other materials known to improve these properties are described, for example, in U.S. Pat. No. 5,791,109, and may also be incorporated into the gypsum core. Other possible additives include conventional set accelerators, set retarders, foaming agents, dispersing agents, viscosity control agents, etc. For applications in which high humidity or water exposure is expected, use of the water resistant additives described in U.S. Pat. No. 5,791,109 is particularly advantageous.

The gypsum core is therefore normally formed from a slurry or paste comprising plaster or stucco and water, together with various solid and liquid additives that regulate the density or uniformity of the mixture, setting time, and other slurry and finished board properties. The continuous manufacture of gypsum board generally requires the unwinding of two reels of facing sheet material (e.g., multi-ply paper). One reel of lower facing sheet unwinds below the mixer that forms the paste, such that the slurry is applied onto this sheet. Upper facing sheet from a second reel is then brought into contact with the slurry from above, thereby sandwiching the slurry. The "sandwich" of slurry and adjacent facing sheets is then passed through a mold or other forming device for establishing the thickness of the gypsum board. The slurry is then allowed to set and form the gypsum core by hydration of the plaster or stucco. During this setting process, the core hardens as the gypsum mineral (calcium sulfate dihydrate) is formed.

Figure 1:
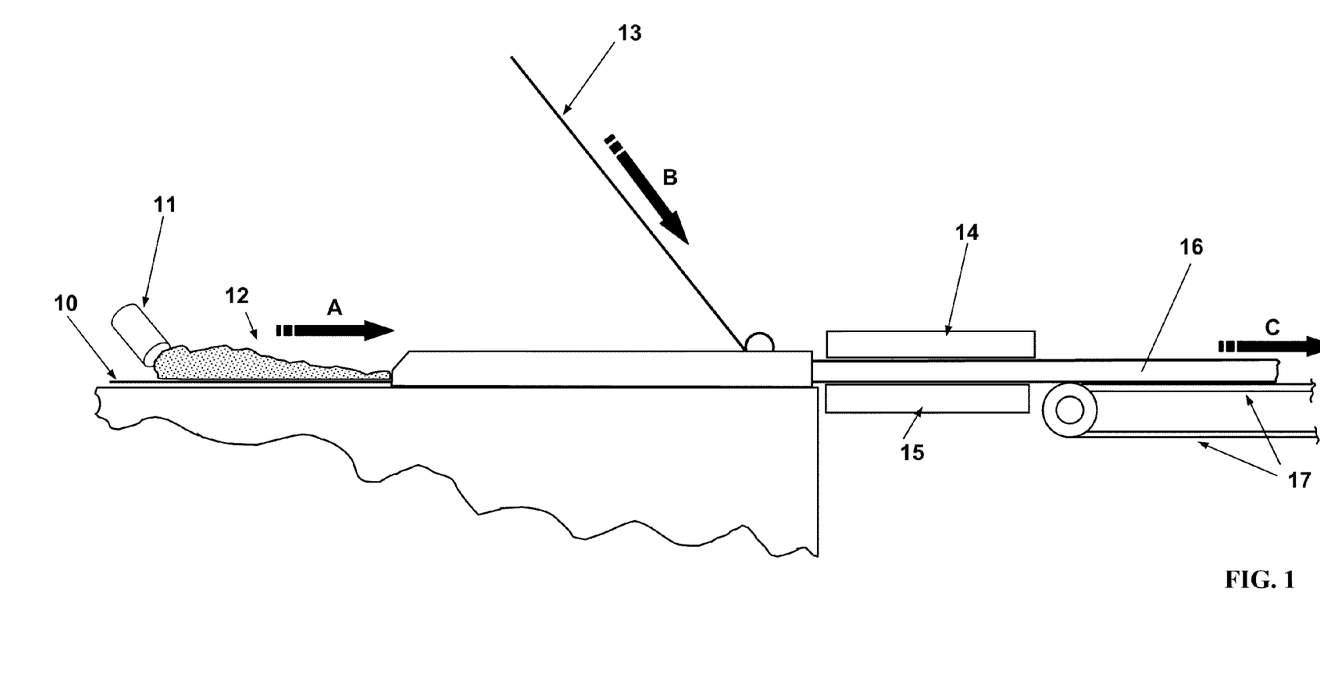
FIG. 1 is a partial schematic view of a portion of a gypsum wallboard production line.
Figure 2:
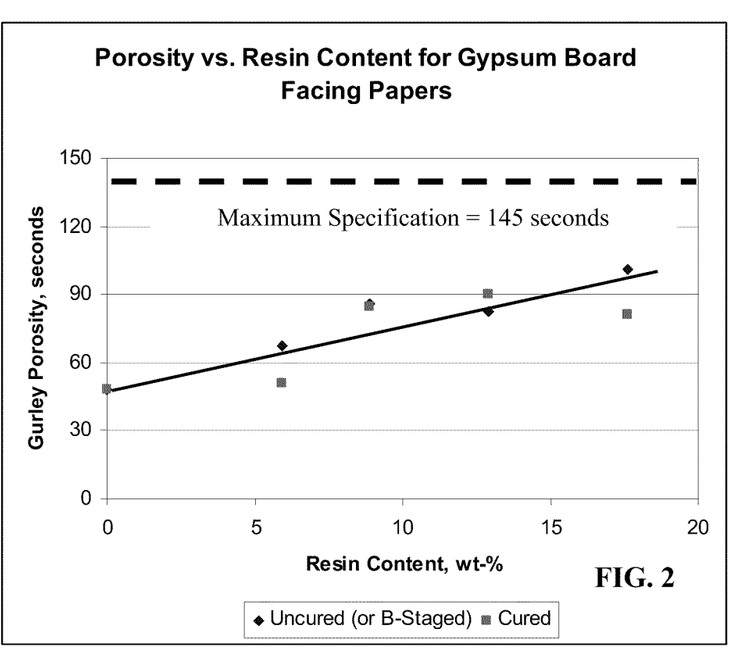
FIG. 2 shows the relationship between the Gurley porosity of gypsum facing paper samples, measured as the time in seconds for a given volume/area of air to pass through the paper, as a function of the resin content of the facing paper.

A process for producing gypsum board is illustrated schematically in FIG. 1, which depicts a portion of a gypsum board manufacturing line. In conventional fashion, dry ingredients from which the slurry is formed are pre-mixed and then fed to a mixer of the type commonly referred to as a pin mixer (not shown). Water and other liquid constituents (e.g., soap or foam, used to control the slurry density), used in forming the slurry, are metered into the pin mixer where they are combined with the dry ingredients to form an aqueous gypsum slurry 12, which emerges from a discharge conduit 11 of the pin mixer. The slurry is deposited through one or more outlets of the discharge conduit 11 onto a continuous, horizontally moving lower facing sheet 10 comprising fibrous material (e.g., multi-ply paper). The amount of slurry deposited can be controlled in manners known in the art. The lower facing sheet 10 is fed from a roll (not shown). Prior to receiving the gypsum slurry 12, the lower facing sheet 10 comprising fibrous material may be scored by one or more scoring devices, allowing the edges of lower facing sheet 10 to be folded upward. These edges may then be glued to overlapping portions of the upper facing sheet 13 according to methods known in the art.

In the practice of the present invention, this lower facing sheet 10 (and/or an upper facing sheet 13) is impregnated with a heat reactive resin (e.g., a B-staged phenolic resin). As explained in more detail hereinafter, if the resin is impregnated predominantly on only one side of the lower facing sheet 10 and/or upper facing sheet 13, then the predominantly resin-impregnated side will face away from the gypsum slurry 12 (i.e., will face downward in the case of the lower facing sheet 10 or upward in the case of the upper facing sheet 13). This generally allows for more effective penetration of the gypsum slurry 12 into at least part of the thickness of the facing sheet(s) 10, 13, for strong, adherent bonding. Partial penetration of the slurry into the facing sheet(s) can be further controlled according to other means, for example by controlling the slurry viscosity.

The lower facing sheet 10 and the deposited gypsum slurry 12 move in the direction of arrow A. The upper facing sheet 13, also comprising fibrous material such as heavy paper, is fed in the direction of arrow B from a roll (not shown) and applied to the upper surface of the gypsum slurry 12. The resulting "sandwich" 16 of gypsum slurry (i.e., the slurry and adjacent facing sheets 10, 13), is pressed to the desired wallboard thickness between plates 14 and 15. Alternatively, the sandwich 16 can be pressed to the desired thickness with rollers or in another manner. The continuous sandwich 16 is then is carried by conveyor(s) 17 in the direction of arrow C. The slurry 12 sets and hardens as it is carried along.

The plaster slurry generally contains more water than necessary solely to reconstitute the gypsum from stucco. This extra water is required in the board forming stage to reduce the stucco slurry viscosity sufficiently to allow for its even distribution (e.g., by using a forming roll) across and between the facing sheets at a desired thickness. As a result of the use of excess water, the gypsum board remains wet after hydration (even though at this point the board may be cut to desired dimensions). Therefore, the formed board is ultimately dried.

The drying operation typically involves applying heat by circulating hot air (e.g., in a drying oven) around the wet gypsum board to evaporate the excess water. It is necessary, therefore, that the facing sheets be sufficiently porous to allow this excess water to readily evaporate without adverse effects such as delamination, tearing, bursting, etc. of the facing sheets. The ability of the facing sheets to easily allow the escape of water vapor also promotes a uniform degree of dryness. This improves overall board quality, since insufficiently dried gypsum board presents storage problems, while over-drying leads to calcination and causes a loss of mechanical strength. Typical drying conditions involve maintaining an ambient or surrounding hot air temperature from about 200° F. to about 600° F. (about 95° C. to about 315° C.), preferably from about 250° F. to about 500° F. (about 120° C. to about 260° C.), for a drying time from about 10 minutes to about 2 hours, preferably from about 30 minutes to about 1 hour, and with a line speed from about 70 to about 250 feet/minute, preferably from about 100 to about 200 feet/minute. These parameters are exemplary and are influenced by the particular configuration of the board manufacturing line.

The present invention is based on the discovery that conventional multi-ply paper facing sheets can be treated (i.e., impregnated) with an uncured or partially cured (i.e., B-staged), heat reactive resin and not interfere with the gypsum drying process. That is, facing sheets treated in this manner can still allow the passage of water vapor, such that the gypsum core can be dried under normal drying conditions. However, when the heat reactive resin is fully cured, the gypsum board is rendered resistant to mold and moisture. Another aspect related to the present invention is the ability of the heat reactive resin to cure under conditions that are similar or identical to those used in the normal drying of the gypsum board. Preferably, therefore, the resin curing and slurry drying occur substantially simultaneously.

The facing sheet of the present invention can comprise any fibrous material known to be suitable for facing gypsum board. Preferred materials include paper, such as heavy, single or multi-ply paper (e.g., medium or heavy kraft paper, manila paper, etc.) and cardboard. The use of multi-ply paper is especially preferred for the facing material. Multi-ply paper commonly used for the facing sheet of gypsum board products typically has a basis weight from about 50 to about 60 pounds per 1000 square feet, an overall caliper of about 250 to 350 microns, and a Gurley porosity from about 15 seconds to about 145 seconds. Often, different types of paper are used for each gypsum board surface. For example, manila paper is frequently used on one side, while newsliner is used on the opposite side. Paper and cardboard facing materials are normally made from recycled fibers (e.g., used corrugated paper, kraft cuttings, or waste newsprint), but they may also be partially or wholly made from virgin fibers. Other natural or synthetic fibrous materials may be used, including those derived from metals or glass (e.g., fiberglass mat, chopped or continuous strand mat, or glass roving, both woven and non-woven). Examples of fibrous non-woven mats are found in U.S. Pat. Nos. 5,772,846 and 4,647,496. Other useful materials for the facing sheet include filament forming synthetic organic polymers (e.g., nylon, polyesters, polypropylene, polyethylene, rayon, and cellulosics), ceramics, cotton, cloth, hair, felt, etc. Fibrous mats may be bound e.g., with a resin binder. Multiple layers of fibrous materials, for example a composite sheet of a glass mat and kraft paper, may also be used.

In making the mold- and moisture-resistant gypsum board of the present invention, an upper or lower facing sheet as described above, or preferably both, is impregnated with a heat reactive resin. By "heat reactive" is meant that the resin is thermosetting, i.e., the resin or resin composition has reactive functional groups (e.g., alkylol groups) that cause the resin to further polymerize or crosslink when heat is applied. This polymerization reaction is also commonly referred to as thermosetting, a term used to describe the use of heat to form of a rigid, crosslinked polymer end product (e.g., a coating). Preferred types of heat reactive resins that may be thermoset include the reaction products of an aldehyde and an aldehyde-reactive compound that is an aromatic alcohol. Other preferred heat reactive resins include epoxy resins, polyesters, and polyurethanes.

Representative of suitable aldehydes for forming the heat reactive resin are formaldehyde, or other aliphatic aldehydes such as acetaldehyde, propionaldehyde, n-butylaldehyde, n-valeraldehyde, n-caproaldehyde, and n-heptylaldehyde. Aldehydes also include aromatic aldehydes (e.g., benzylaldehyde and furfural), and other aldehydes such as glyoxal, and crotonaldehyde. Mixtures of aldehydes may also be used.

Preferably, due to its commercial availability and relatively low cost, formaldehyde is used. Skilled practitioners recognize that formaldehyde is commercially available in many forms. Any form which is sufficiently reactive and which does not introduce extraneous moieties deleterious to the desired reaction product can be used in the preparation of heat reactive resins useful in the invention. For example, commonly used forms of formaldehyde include paraform (solid, polymerized formaldehyde) and formalin solutions (aqueous solutions of formaldehyde, sometimes with methanol, in 37 percent, 44 percent, or 50 percent formaldehyde concentrations). Formaldehyde also is available as a gas. Typically, formalin solutions are used as the formaldehyde source. Formaldehyde may also be substituted in whole or in part with any of the aldehydes described above (e.g., glyoxal). Materials that form formaldehyde in situ can also be employed.

If formaldehyde is used as the aldehyde reactant of the resin, the free formaldehyde content of the resin will be preferably below 5%, more preferably below 3%, and even more preferably below 1%. A low content of formaldehyde is generally preferred to limit exposure to formaldehyde emissions. If desired, conventional "formaldehyde scavengers" that are known to react with free formaldehyde may be added to the resin to reduce the level of free formaldehyde.

As potential aldehyde reactive compounds used to make the heat reactive resin, representative aromatic alcohols include phenol; phenol alkylated with one or more alkyl moieties having up to about 10 carbon atoms, such as o-, m-, and p-cresol, xylenols (e.g., 3,4-xylenol or 3,5-xylenol), p-tert-3,4,5-trimethylphenol, 3-ethyl phenol, 3,5-diethyl phenol, p-butyl phenol, 3,5-dibutyl phenol, and p-amylphenol. Other aromatic alcohols include p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Additionally, aromatic alcohols include the class of compounds commonly known as bisphenols, (e.g., 4,4'-alkylidene-diphenol). Examples of suitable bisphenols that can be used include 4,4'-isopropylidene-diphenol (commonly known as bisphenol-A), 4,4'-methylidene-diphenol (commonly known as bisphenol-F), and 4,4'-sec-butylidene-diphenol. Mixtures of aromatic alcohols, such as those obtained from blending bisphenol-A with a small amount of another di-functional phenol (e.g., resorcinol, catechol, hydroquinone, or p,p'-dihydroxy biphenyl) may also be used.

If an aromatic alcohol (e.g., phenol) is used as the aldehyde-reactive compound, the heat reactive resin is generally characterized as a phenolic resin. Thermosetting phenolic resins are typically obtained as the reaction product of an aromatic alcohol and an aldehyde in the presence of an alkaline catalyst (e.g., sodium hydroxide). An elevated temperature, generally from about 120° F. to about 300° F. (about 50° C. to about 150° C.) at a time from about 15 minutes to about 3 hours, is normally required to cause alkylolation (e.g., methylolation) of at least some of the reactive sites of the aromatic alcohol. Alkylolation refers to the addition of a hydroxyalkyl functionality at reactive sites (generally the ortho- and para-positions of the aromatic rings) of the aromatic alcohol, to form an adduct. With respect to the preparation of a phenol-formaldehyde adduct, for example, process parameters are well known in the art and described, for example, in U.S. Pat. No. 6,706,845.

It is also known to incorporate various agents into heat reactive phenolic resins. For example, the use of glycol or glycol derivatives that function as reactive plasticizing diluents is described in U.S. Pat. No. 4,785,073. Other agents described in this patent include accelerators. Agents to improve toughness and other cured resin properties, fire retardants, fillers, reactive modifiers, organic solvents, and nitrogen-containing acidic phosphorous latent curing agents, as described in U.S. Pat. No. 5,864,003, may also be incorporated. Further agents that may be used include resin modifiers to promote hydrolysis resistance and polymer flexibility, as described in U.S. Pat. No. 5,681,917. Additional plasticizers, as well as thickeners, anti-foam agents, and cure accelerators, as described in U.S. Pat. No. 6,132,549, may also be employed to the extent that they do not interfere with the required porosity of the facing sheet during gypsum board production.

Depending on the molar ratio of aldehyde to aromatic alcohol used in preparing the phenolic resin adduct, a resole or a novolac may be obtained. These types of phenolic resin polymers are described, for example, in Rempp and Merrill, POLYMER SYNTHESIS, Huthig & Wepf (1986), p. 56-57. In order to become "heat reactive", novolacs require the addition of a cross linking agent (e.g., a polyamine such as hexamethylenetetramine). In contrast, resoles generally have, on average, more than one reactive alkylol functionality per aromatic alcohol and can thus form cross links upon heating, even in the absence of an added cross linking agent. In any case, if a heat reactive phenolic resin is employed, it can also be a more advanced reaction product, e.g., a resin polymer network averaging 2-20 monomer units in size (joined by alkylene ether bridges or alkylene bridges after subsequent condensation), which may result from acid-catalyzed reaction or condensation of the functional alkylolated species described above.

Of the variety of heat reactive resins discussed above as being the reaction product of an aldehyde and an aldehyde-reactive compound, phenol-formaldehyde is preferred. Polyvinyl acetate, acrylics, or other modifiers may be incorporated into these resins to the extent they do not interfere with the required porosity of the facer during gypsum board production. Also, regardless of which particular aldehyde-reactive compound is used, the preferred aldehyde, as described above, is formaldehyde, either in its pure form or mixed with other aldehydes. Also, when a phenol-formaldehyde resin is used, the reaction product is preferably obtained at a molar ratio of formaldehyde to phenol (F/P) from about 0.8:1 to about 1.7:1. These low mole ratio resins give the impregnated facing sheet good flexibility before curing. Higher F/P mole ratio resins, typically in the range from about 1.8:1 to about 2.5:1 may also be used, although they must generally be modified with a plasticizer such as a thermoplastic latex to give the impregnated facing sheet sufficient flexibility when the resin is B-staged. Without a plasticizer, these higher mole ratio resins alone will be too high in cross link density and therefore brittle when B-staged.

The heat reactive resins of the present invention for impregnating the gypsum board facing sheet may be prepared in various forms such as aqueous or organic (i.e., waterborne, solvent borne, or mixtures) solutions, dispersions, or emulsions. The advantages of waterborne resins include the elimination of solvent emissions. The preparation of aqueous dispersions of phenol-formaldehyde resins is described, for example, in U.S. Pat. Nos. 4,124,554 and 5,552,186. Such aqueous dispersions typically involve the addition of a coupling solvent (e.g., an alkyl ether derivative of glycol) that is compatible with both the resin and the continuous aqueous phase. In addition, a protective colloid (e.g., polyvinyl alcohol) may also be used. Other possible additives include miscible coalescing solvents to facilitate blending and dilution, flexible resin materials (e.g., latex-based or aqueous phenoxy resins), and pH adjusting agents (e.g., triethanolamine), as described in the above-mentioned U.S. Pat. No. 5,552,186. The solubility of any particular heat reactive resin in a given aqueous or organic solvent is a function of its molecular weight. Therefore, a low molecular weight heat reactive resin, for example, may be in solution form (i.e., dissolved in a liquid solvent), whereas a higher molecular weight resin of the same type may be in the form of a dispersion, even though in the presence of the same liquid (in this case a liquid dispersing medium). Skilled practitioners will recognize the ability of various forms of heat reactive resins to wet various types of facing sheet.

Heat reactive resins of the present invention are preferably in the form of aqueous or organic (i.e., waterborne or solvent borne) solutions and preferably have a number average molecular weight $M_n$ from about 50 to about 1000 grams/mole, and more preferably from about 100 to about 500 grams/mole. As is known in the art, the value of $M_n$ of a polymer sample having a distribution of molecular weights is defined as $$M_n = \frac{\sum_i N_i M_i}{\sum_i N_i},$$

where $N_i$ is the number of polymer species having i repeat units and $M_i$ is the molecular weight of the polymer species having i repeat units. The number average molecular weight is typically determined using gel permeation chromatography (GPC), using solvent, standards, and procedures well known to those skilled in the art.

Whether used to treat (e.g., by impregnation or deposition) the gypsum board facing sheet as a solution, as a dispersion, or as an emulsion, heat reactive resins of the present invention preferably contain from about 40% to about 90% resin solids or non-volatiles, and more preferably, 55% to 75% non-volatiles. The non-volatiles content is measured by the weight loss upon heating a small (e.g., 1-5 gram) sample of the resin composition at about 135° C. for about 3 hours. An essentially "neat" form of the heat reactive resin, having few or no volatile components, may also be used to impregnate the facing sheet, generally as a viscous liquid. Neat forms of the heat reactive resins may be obtained from solutions or dispersions of these resins using conventional drying techniques, prior to application to the facing sheet. Because of their generally higher viscosity compared to resin solutions or dispersions having a substantial amount of volatile components, neat resins may need to be calendared onto the facing sheet. When used in aqueous solution or dispersion form, the heat reactive resin will generally have, at 25° C., a Brookfield viscosity from about 10 to about 10,000 cps, a specific gravity from about 1.002 to about 1.25 g/ml, and a pH from about 6.0 to about 9.5, for ease of application to, and for good compatibility with, the facing sheet. It is expected that best results are obtained when the resin is applied as a solution, dispersion, or emulsion.

In the practice of the present invention, the gypsum board facing sheet is impregnated with a heat reactive resin in an amount such that, in its partially-cured (i.e., B-staged) state it allows water vapor passage through the facing sheet and in its cured state it provides mold and moisture resistance to the facing sheet. Preferably, the amount impregnated represents, after curing, from about 1% to about 30%, and more preferably from about 5% to about 20%, of the weight of the facing sheet. These ranges are based on the resin solids content and do not include the weight of any resin water, organic solvent, or dispersing agent.

The resin may be impregnated into one or both surfaces of the facing sheet by immersion of the sheet into the resin (e.g., by dipping in a dip bath to saturate the facing sheet), by metering a set amount of resin onto the sheet, by the use of rollers (e.g., calendaring), by spraying or curtain coating, etc. Combinations of methods may also be employed. If the facing sheet is saturated with resin by dipping, the resin is preferably diluted to a solids content from about 5% to about 20% (e.g., using alcohol or water). In the case of dipping, the amount of heat reactive resin impregnated preferably represents the amount that saturates the facing sheet during its preparation. After the resin is initially deposited by dipping, therefore, the facing sheet may be drained of excess resin (e.g., by being squeezed through rollers), which can be recycled for use in impregnating the facing sheet. If a metering process is used to impregnate the resin, the resin solids content is preferably from about 15% to about 40%.

In a preferred embodiment, the heat reactive resin is deposited onto only one side of the facing sheet, namely the side that is not contiguous with the gypsum core (i.e., outer surface). In this manner, the other side (i.e., the inner surface) has little or no heat reactive resin in the adjacent portion of the paper facing, which is contiguous with the gypsum core. This construction allows for improved bonding, during gypsum board preparation, between the gypsum slurry and the facing sheet fibers that contact the gypsum slurry. Preferably, therefore, a thickness of facing sheet of at least about 10 μm, up to about 50 μm or more, on the facing sheet side that is contiguous with the gypsum slurry, has little heat reactive resin (or is substantially free of the heat reactive resin), thereby improving the penetration and ultimately the bonding between the gypsum slurry and the contiguous fibers of the resin-impregnated facing sheet. The impregnation of resin onto one side of the facing sheet may be accomplished in a number of ways. For example, the heat reactive resin may be spray coated or calendared onto one side only. Alternatively, in producing the facing sheet, only one or more outer plies of a multi-ply facing sheet may be treated with resin (e.g., by dipping), while one or more inner plies, bonded thereto, may remain untreated. Regardless of whether one or both sides of the facing sheet are treated, the bonding of the facing sheet with the core of gypsum slurry may also be improved by incorporating an adhesive, such as starch or polyvinyl alcohol, into the gypsum slurry core, or into only the region of the core-facer interface, as described in U.S. Pat. No. 6,746,781.

After treating or impregnating the facing paper with heat reactive resin during its preparation, the facing paper is preferably heated (e.g., dried) to evaporate liquid (e.g., water, organic solvent, or dispersing agent) from the heat reactive resin. While the heat applied at this point does not fully cure the resin, it is normally sufficient to effect at least some drying and possibly some partial curing of the resin. One or a series of drying ovens may be used, for example, to convert an A-staged resin to a B-staged heat reactive resin (e.g., a B-staged phenolic resin), resulting in a "B-staged paper" that is ultimately fully cured in the conventional gypsum core drying step, used in gypsum board manufacturing. The paper is then stored as large rolls of B-staged paper for later use in the gypsum board manufacturing facility, as described previously. Preferably, therefore, the heat reactive resin used in the method of the present invention is B-staged resin. The drying and optionally, partial curing of the resin is desirable for ease of handling and use of large rolls of the resin-impregnated facing paper in the normal gypsum board manufacturing process.

Surprisingly, B-staged paper used for gypsum board facing sheets of the present invention, although impregnated with resin, has been found to exhibit sufficient porosity such that the conventional drying step in gypsum board manufacturing is not impeded. In fact, B-staged paper may be impregnated with a substantial amount (e.g., 30% by weight) of heat reactive resin, and still exhibit a Gurley porosity value that is less than the 145 second threshold typically required for gypsum board facing paper. Preferably, the Gurley porosity of B-staged paper of the present invention is less than about 120 seconds, and typically it is from about 60 to about 100 seconds. Moreover, the Gurley porosity values do not change significantly upon curing of the heat reactive resin in the B-staged paper. On the other hand, curing of the resin has been found to significantly improve the moisture resistance of the B-staged paper. After the B-staged resin is cured or thermoset (to yield "cured paper"), the water absorption of the facing paper is preferably less than about 30 $g/m^2$ and more preferably less than about 10 $g/m^2$, as measured using a modified Cobb test. The modified Cobb test referred to herein measures water absorption of the paper after 3 minutes at 120° F. water temperature. The tensile strength characteristics of the B-staged paper and cured paper are also acceptable for gypsum board manufacturing applications and are in fact normally well above those of the facing paper without resin impregnated thereon. For B-staged paper, the dry cross direction (CD), dry machine direction (MD), and wet machine direction (MD) Thwing-Albert tensile strengths, are preferably in the ranges from 28-40 lbs/inch, 75-120 lbs/inch, and 10-20 lbs/inch, respectively. For the cured paper, these ranges are respectively 35-50 lbs/inch, 100-140 lbs/inch, and 30-100 lbs/inch.

The facing sheet, having been treated or impregnated with heat reactive resin in an amount as described above, is used to face or overlay gypsum board of the present invention. That is, a slurry of plaster or stucco that forms the gypsum core is applied to the facing sheet. A heating step is then used to fully cure the resin and dry the gypsum core, thereby yielding the gypsum board. This heating step may comprise one or more stages of heating for differing durations and at differing temperatures, depending on the type of resin used and the extent to which it is cured, prior to the gypsum core drying step. For example, low temperature heating (e.g., below about 200° F. or about 95° C.) may be employed initially for predominantly drying purposes, followed by heating at a higher temperature (e.g., about 200° F. to about 600° F. or about 95° C. to about 315° C.) to effect resin curing, combined with further drying. As noted previously, the resin curing and gypsum board drying preferably occur substantially simultaneously.

Using the method as described above, a gypsum board is obtained that is rendered mold- and moisture resistant by virtue of the completed cure of the heat reactive resin used to treat the facing sheet. Advantageously, the method can be easily adapted to current gypsum board manufacturing processes. It is generally not necessary to incorporate additional layers of material (e.g., polyurethane) between the facing sheet and gypsum core to resist delamination, improve the degree of water resistance, provide stress relief, etc.

All references cited in this specification, including without limitation, all U.S., international, and foreign patents and patent applications, as well as all abstracts and papers (e.g., journal articles, periodicals, etc.), are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

EXAMPLES

Samples of conventional facing paper used for gypsum board were impregnated with differing amounts of a solvent-borne, heat reactive phenolic resin. After air drying overnight to yield uncured or "B-staged" paper, the resin content of the samples was measured at 5.9%, 8.9%, 12.9%, and 17.6% by weight. Some of the papers at each of these levels of resin treating were then cured at 360° F. (180° C.). All paper handsheets were equilibrated at constant humidity and temperature prior to testing.

Conventional untreated facing paper, B-staged facing paper, and cured facing paper were then analyzed to determine the suitability of B-staged, resin-impregnated facing paper for use in gypsum board production. That is, among other properties, the ability of the B-staged facing paper to allow vapor passage (relative to conventional untreated facing paper) for normal gypsum slurry drying, as well as the ability of the cured facing paper (after this drying step) to provide mold and moisture resistance, were tested. The following analyses were conducted on conventional facing paper, as well as B-staged and cured facing paper at the varying resin impregnation levels: (1) Gurley porosity, measuring the time for a given volume/area of air to pass through the paper, (2) water absorption by a modified Cobb test, measuring the weight/area of water absorption of the paper at 3 minutes and 120° F., and (3) Thwing-Albert tensile strength, measuring the tear strength of the paper, in force/unit length in both the cross direction (CD) and machine direction (MD) of the paper fibers. The MD tensile strength was measured under both wet and dry conditions. Several measurements were taken for each test.

The following data, shown below in Table 1, were generated for conventional untreated facing paper, and B-staged and cured facing paper, impregnated with 5.9% resin by weight:

TABLE 1

Properties of Untreated Facing Paper and Facing Paper Impregnated with 5.9 wt-% Phenolic Resin (B-Staged and Cured)

|  | Untreated Paper | | | B-Staged Paper | | | Cured Paper | | |
| --- | --- | --- | --- | --- | --- | --- | --- | --- | --- |
|  | White side up | Reverse side | Average | White side up | Reverse side | Average | White side up | Reverse side | Average |
| Porosity (seconds) | 48.2 | 43.7 | 46.0 | 78.3 | 56.9 | 67.6 | 51.4 | 46.4 | 48.9 |
|  | 47.1 | 43.2 | 45.2 | 74.4 | 62.1 | 68.3 | 53.3 | 44.5 | 48.9 |
|  | 52.2 | 47.1 | 49.7 | 69.6 | 55.4 | 62.5 | 58.7 | 48.3 | 53.5 |
|  | 54.3 | 46/3 | 50.3 | 77.5 | 60.1 | 68.8 | 56.7 | 50.4 | 53.6 |
|  | 55.5 | 46.6 | 51.1 | 74.2 | 54.9 | 64.6 | 58.9 | 48.6 | 53.8 |
|  | 51.2 | 45.7 | 48.5 | 82.3 | 62.8 | 72.6 | 49.5 | 43.5 | 46.5 |
| Average | 51.4 | 45.4 | 48.4 | 76.1 | 58.7 | 67.4 | 54.8 | 47.0 | 50.9 |
| Std dev | 3.3 | 1.6 | 2.4 | 4.3 | 3.4 | 3.5 | 3.9 | 2.6 | 3.1 |
|  | Dry CD | Stretch | | Dry CD | Stretch | | Dry CD | Stretch | |
| Dry CD Tensile Strength (lbs/in) | 26.2 | 2.3 | | 28.9 | 5.5 | | 33.6 | 4.4 | |
|  | 27.1 | 2.4 | | 29.2 | 6.1 | | 34.3 | 4.7 | |
|  | 26.6 | 1.9 | | 30.1 | 6.5 | | 36.8 | 5.2 | |
|  | 27.4 | 2.1 | | 29.4 | 6.2 | | 37.3 | 5.7 | |
|  | 27.4 | 2.2 | | 29.5 | 6.1 | | 36.2 | 5.2 | |
|  | 27.6 | 2.2 | | 29.7 | 6.0 | | 36.8 | 5.4 | |
|  | 25.9 | 2.2 | | 29.9 | 6.8 | | 37.0 | 6.1 | |
|  | 26.3 | 2.1 | | 29.1 | 5.9 | | 35.4 | 5.6 | |
|  | 26.6 | 2.1 | | | | | | | |
|  | 26.4 | 2.1 | | | | | | | |
|  | 26.9 | 2.2 | | | | | | | |
|  | 27.0 | 2.3 | | | | | | | |
| Average | 26.8 | 2.2 | | 29.5 | 6.1 | | 35.9 | 5.3 | |
| Std dev | 0.5 | 0.1 | | 0.4 | 0.4 | | 1.4 | 0.5 | |
|  | Dry MD | Stretch | | Dry MD | Stretch | | Dry MD | Stretch | |
| Dry MD Tensile Strength (lbs/in) | 75.7 | 1.7 | | 86.2 | 2.3 | | 105.7 | 2.7 | |
|  | 77.5 | 1.9 | | 87.2 | 2.4 | | 104.2 | 2.7 | |
|  | 79.7 | 1.8 | | 78.8 | 1.9 | | 104.4 | 2.6 | |
|  | 77.4 | 1.8 | | 84.0 | 2.1 | | 106.1 | 2.7 | |
|  | 75.5 | 1.6 | | 83.6 | 2.2 | | 105.9 | 2.7 | |
|  | 76.4 | 1.8 | | 82.6 | 2.2 | | 102.8 | 2.6 | |
|  | 78.4 | 1.9 | | 82.5 | 2.2 | | 101.0 | 2.5 | |
|  | 77.4 | 1.8 | | 81.6 | 2.1 | | 103.4 | 2.6 | |
|  | 75.8 | 1.7 | | 80.8 | 2.1 | | 106.2 | 2.6 | |
|  | 73.8 | 1.7 | | 80.9 | 2.1 | | 103.4 | 2.6 | |
|  | 77.8 | 1.8 | | 81.1 | 2.2 | | 107.0 | 2.7 | |
|  | 76.1 | 1.8 | | 82.5 | 2.3 | | | | |
| Average | 76.8 | 1.8 | | 82.7 | 2.2 | | 104.6 | 2.6 | |
| Std dev | 1.6 | 0.1 | | 2.4 | 0.1 | | 1.8 | 9.1 | |
|  | Wet MD | Stretch | | Wet MD | Stretch | | Wet MD | Stretch | |
| Wet MD Tensile Strength (lbs/in) | 6.6 | 1.1 | | 9.9 | 1.4 | | 37.2 | 2.4 | |
|  | 6.3 | 1.2 | | 10.0 | 1.4 | | 38.8 | 3.1 | |
|  | 6.3 | 1.4 | | 9.9 | 1.4 | | 36.6 | 2.8 | |
|  | 6.2 | 1.1 | | 10.1 | 1.4 | | 38.1 | 2.9 | |
|  | 6.3 | 1.1 | | 9.8 | 1.2 | | 38.8 | 2.8 | |
|  | 6.2 | 1.1 | | 9.8 | 1.3 | | 37.6 | 3.1 | |
|  | 6.0 | 1.3 | | 10.0 | 1.5 | | 37.0 | 2.9 | |
|  | 6.1 | 1.2 | | 10.0 | 1.4 | | 36.2 | 3.0 | |
|  | 6.2 | 1.2 | | 9.9 | 1.2 | | 37.0 | 2.9 | |
|  | 6.1 | 1.1 | | 9.9 | 1.2 | | 37.1 | 2.9 | |
|  | 5.9 | 1.2 | | 10.0 | 1.3 | | 37.3 | 2.7 | |
|  | 6.1 | 1.1 | | | | | 36.6 | 2.8 | |
| Average | 6.2 | 1.2 | | 9.9 | 1.3 | | 37.4 | 2.9 | |
| Std dev | 0.2 | 0.1 | | 0.1 | 0.1 | | 0.8 | 0.2 | |

The tests described above were also used to analyze facing paper impregnated with 8.9%, 12.9%, and 17.6% by weight of the heat reactive phenolic resin. The results shown below in Table 2, in comparison with the untreated facing paper and facing paper impregnated with 5.9% by weight of the heat reactive phenolic resin, represent the average values obtained for several measurements:

TABLE 2

Properties of Untreated Facing Paper and Facing Paper Impregnated with 5.9%, 8.9%, 12.9%, and 17.6% Phenolic Resin by Weight

| Resin Content, wt-% | B-Staged Paper | Cured Paper |
|---|---|---|
| POROSITY (seconds) | | |
| 0% (untreated) | 48.4 | 48.4 |
| 5.9 | 67.4 | 50.9 |
| 8.9 | 86.2 | 84.5 |
| 12.9 | 82.3 | 90.3 |
| 17.6 | 101.3 | 81.2 |
| WATER ABSORPTION BY MODIFIED COBB TEST (seconds) | | |
| 0% (untreated) | 58.5 | 58.5 |
| 8.9 | 57.0 | 8.3 |
| 12.9 | 68.0 | 8.2 |
| 17.6 | 106.1 | 2.2 |
| DRY CD TENSILE STRENGTH (lbs/in) | | |
| 0% (untreated) | 26.8 | 26.8 |
| 5.9 | 29.5 | 35.9 |
| 8.9 | 30.1 | 37.2 |
| 12.9 | 34.7 | 40.2 |
| 17.6 | 37.2 | 48.0 |
| DRY MD TENSILE STRENGTH (lbs/in) | | |
| 0% (untreated) | 76.8 | 76.8 |
| 5.9 | 82.7 | 104.6 |
| 8.9 | 89.8 | 115.9 |
| 12.9 | 98.9 | 132.2 |
| 17.6 | 107.7 | 142.2 |
| WET MD TENSILE STRENGTH (lbs/in) | | |
| 0% (untreated) | 6.2 | 6.2 |
| 5.9 | 9.9 | 37.4 |
| 8.9 | 13.7 | 52.0 |
| 12.9 | 16.2 | 70.1 |
| 17.6 | 18.6 | 86.9 |

Figure 3:
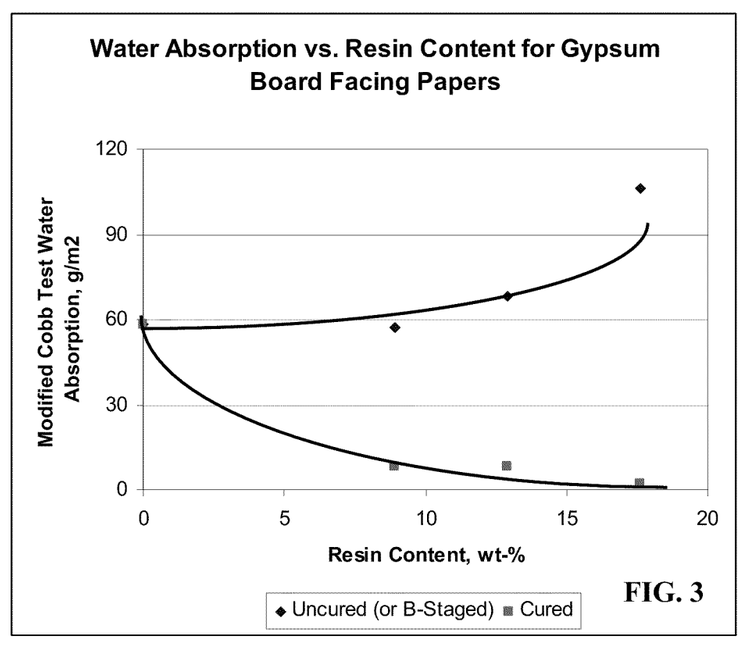
FIG. 3 shows the relationship between the water absorption, by a modified Cobb test, of gypsum facing paper samples, measured in grams/$m^2$ of water absorption of the paper at 3 minutes and 120° F., as a function of the resin content of the facing paper.
Figure 4:
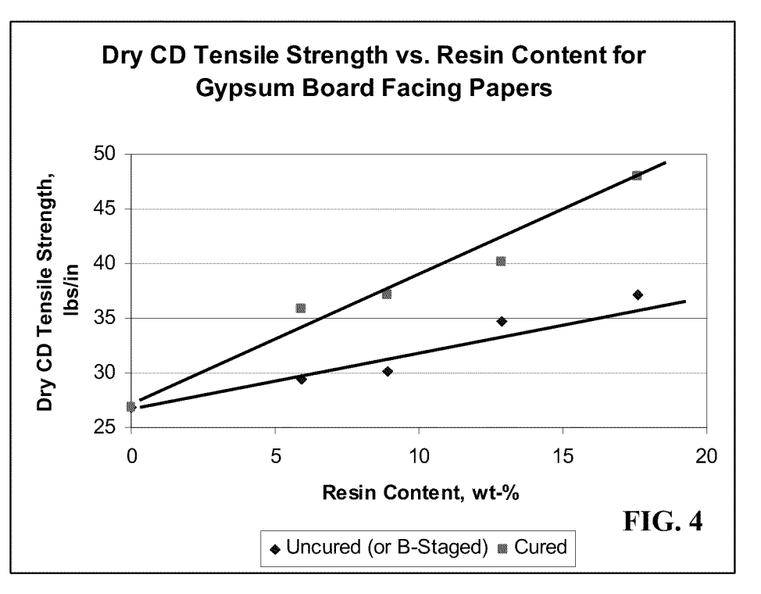
FIG. 4 shows the relationship between the dry Thwing-Albert tensile strength of gypsum facing paper samples, measured in pounds/inch of tear strength in the cross direction (CD) of the paper fibers, as a function of the resin content of the facing paper.
Figure 5:
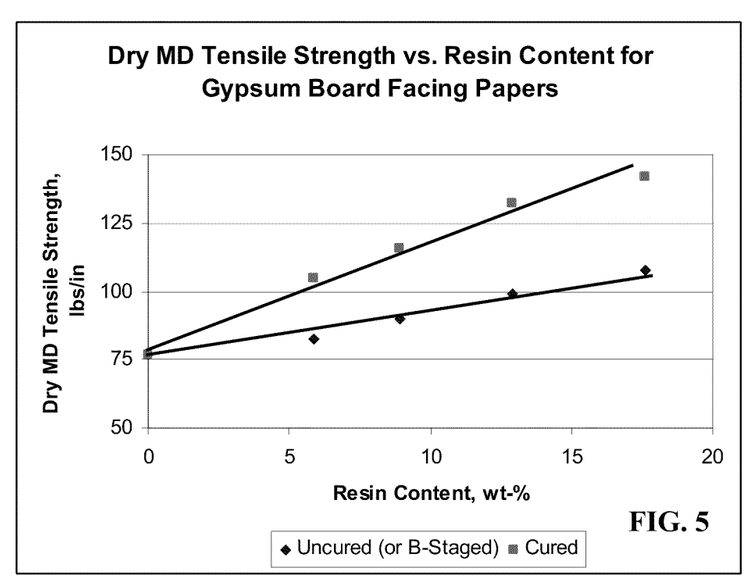
FIG. 5 shows the relationship between the dry Thwing-Albert tensile strength of gypsum facing paper samples, measured in pounds/inch of tear strength in the machine direction (MD) of the paper fibers, as a function of the resin content of the facing paper.
Figure 6:
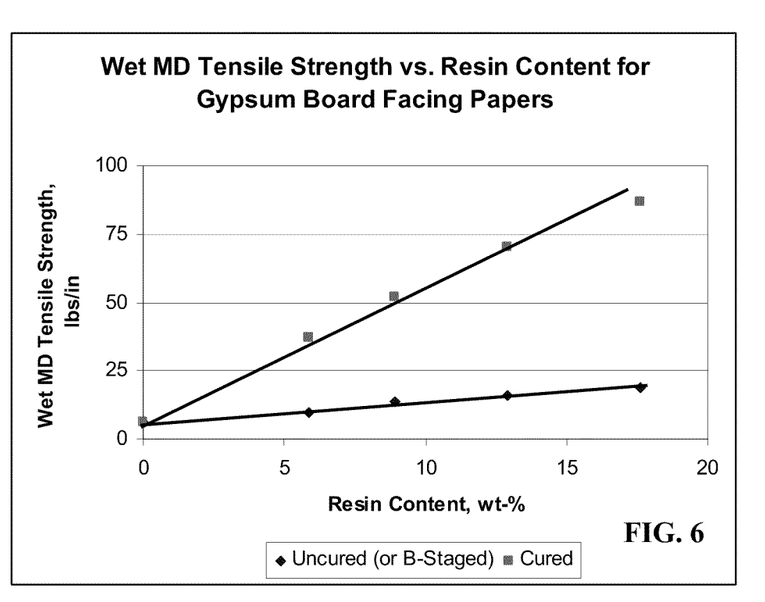
FIG. 6 shows the relationship between the wet Thwing-Albert tensile strength of gypsum facing paper samples, measured in pounds/inch of tear strength in the machine direction (MD) of the paper fibers, as a function of the resin content of the facing paper.

The data presented in Table 2 was used to generate FIGS. 2-6. Results of the porosity measurements show that, as expected, porosity generally decreases with increasing resin content, for both the B-staged and cured paper samples. This was evidenced by the increasing Gurley porosity times, as indicated above and shown graphically in FIG. 2. Importantly, however, all measured porosity values were well below the maximum specification of 145 seconds for gypsum facing paper. This indicated that facing papers impregnated with resin at every level tested above would perform adequately in terms of allowing a gypsum slurry to dry or set in a typical gypsum board manufacturing process. Moreover, compared to the untreated paper samples, as well as the uncured or B-staged paper samples, the cured paper samples showed significantly lower water absorption, as measured in the modified Cobb test. These results are depicted in FIG. 3, which illustrates the ability of heat-reactive resin impregnated facing paper of the present invention to resist mold and moisture penetration after the impregnated resin is cured. Finally, the wet and dry tensile strength measurements show increasing paper strength as resin content is increased, and this strength effect is more pronounced for the cured paper samples, relative to the uncured or B-staged samples. The tensile strength results are depicted in FIGS. 4-6.

What is claimed is:

1. A mold- and moisture-resistant gypsum board made by a method comprising:
   (a) applying a plaster slurry that forms a gypsum core to an upper and a lower facing sheet to form a structure in which the plaster slurry is sandwiched between the upper and lower facing sheets, at least one of the upper or the lower facing sheet having previously been treated with a heat reactive resin so that the heat reactive resin is impregnated into at least one of the upper or the lower facing sheets; and
   (b) heating the structure sufficiently to cure said heat reactive resin and dry said gypsum core, thereby yielding said gypsum board,
   wherein the at least one of the upper or the lower facing sheet impregnated with the heat reactive resin has a total thickness (t), and wherein the heat reactive resin is impregnated into the at least one of the upper or the lower facing sheet a depth ranging from about t-50 μm to about t-10 μm to provide a thickness of about 10 μm to about 50 μm between the heat reactive resin and a surface of at least one of the upper or the lower facing sheet that is contiguous with the gypsum core that is substantially free of the heat reactive resin.

2. The gypsum board of claim 1 comprising a gypsum core that is faced on one or both faces with multi-ply facing paper comprising a thermoset resin in an amount representing from about 1% to about 30% of the weight of said facing paper.

3. The gypsum board of claim 2, wherein said thermoset resin provides mold and moisture resistance to said board.

4. The gypsum board of claim 2, wherein said thermoset resin comprises the reaction product of an aldehyde and an aromatic alcohol.

5. The gypsum board of claim 4, wherein said thermoset resin is a phenol-formaldehyde resin that is prepared either from a phenolic resole or from a phenolic novolac with an added cross linking agent.

6. The gypsum board of claim 5, wherein said phenol-formaldehyde resin is fully cured after a gypsum core drying step in the manufacture of said gypsum board.

7. A mold- and moisture-resistant gypsum board made by a method comprising:
   (a) applying a plaster slurry that forms a gypsum core to an upper and a lower facing sheet to form a structure in which the plaster slurry is sandwiched between the upper and lower facing sheets, at least one of the upper or the lower facing sheet having previously been impregnated with a heat reactive resin; and
   (b) heating the structure sufficiently to cure said heat reactive resin and dry said gypsum core, thereby yielding said gypsum board; and
   (c) prior to said applying step (a), impregnating at least one of the upper or the lower facing sheet with said heat reactive resin, wherein the heat reactive resin is impregnated into the at least one of the upper or the lower facing sheet a depth less than a thickness of the at least one of the upper or the lower sheet such that a thickness of about 10 μm to about 50 μm between a surface of the at least one of the upper or the lower facing sheet that is contiguous with the gypsum core is substantially free of the heat reactive resin.

8. A mold- and moisture-resistant gypsum board, comprising:
   a gypsum core;
   a first facing sheet disposed on a first side of the gypsum core; and
   a second facing sheet disposed on a second side of the gypsum core, wherein a side of the second facing sheet opposite the gypsum core is impregnated with a cured resin, and wherein a side of the second facing sheet contiguous with the gypsum core is substantially free of the cured resin for a depth of at least 10 μm to about 50 μm into the second facing.

9. The gypsum board of claim 8, wherein a side of the first facing sheet opposite the gypsum core is impregnated with the cured resin, and wherein a side of the first facing sheet contiguous with the gypsum core is substantially free of the cured resin for a depth of at least 10 μm to about 50 μm into the first facing sheet.

10. The gypsum board of claim 8, wherein the first facing sheet, the second facing sheet, or both comprise multi-ply paper.

11. The gypsum board of claim 8, wherein the second facing sheet comprises multi-ply paper, wherein the layer of the multi-ply paper contiguous with the gypsum core is substantially free from the cured resin, and wherein at least one layer of the multi-ply paper opposite the gypsum core is impregnated with the cured resin.

12. The gypsum board of claim 8, wherein the cured resin comprises a reaction product of an aldehyde and an aromatic alcohol.

13. The gypsum board of claim 8, wherein the cured resin comprises phenol-formaldehyde resin.

14. The gypsum board of claim 8, wherein the cured resin is selected from the group consisting of: epoxy resins, polyesters, and polyurethanes.

15. The gypsum board of claim 8, wherein a concentration of the cured resin in the second facing sheet is from about 1 wt % to about 30 wt %, based on the weight of the second facing sheet.

16. The gypsum board of claim 8, wherein a concentration of the cured resin in the second facing sheet is from about 5 wt % to about 20 wt %, based on the weight of the second facing sheet.

17. The gypsum board of claim 8, wherein the first facing sheet, the second facing sheet, or both the first facing sheet and the second facing sheet has a total thickness (t) of about 250 μm to about 350 μm.

18. The gypsum board of claim 8, wherein a water absorption of the second facing paper is less than 30 $g/m^2$, as measured according to a modified Cobb test that measures the water absorption of the second facing sheet after 3 minutes and a water temperature of 120° F.

19. The gypsum board of claim 8, wherein a water absorption of the second facing paper is less than 10 $g/m^2$, as measured according to a modified Cobb test that measures the water absorption of the second facing sheet after 3 minutes and a water temperature of 120° F.

* * * * *